R. T. SMART & R. T. SMART, Jr.
Pumps.

No. 123,203. Patented Jan. 30, 1872.

Witnesses:
A. Bennersdorf.
Geo. W. Mabee.

Inventor:
Robert. T. Smart.
Robert. T. Smart Jr.
PER
Attorneys.

UNITED STATES PATENT OFFICE.

ROBERT T. SMART AND ROBERT T. SMART, JR., OF TROY, NEW YORK.

IMPROVEMENT IN PUMPS.

Specification forming part of Letters Patent No. 123,203, dated January 30, 1872.

Specification describing a new and Improved Pump, invented by ROBERT T. SMART and ROBERT T. SMART, Jr., of Troy, in the county of Rensselaer and State of New York.

Our invention consists of a double-acting pump with a hollow piston-rod, through which the water is discharged, the cylinder being fixed below—or it may be above—the water, in which both of the valves are arranged on the upper side of a plate in a hollow piston, in such a manner that they both close downward self-actingly, irrespective of the direction in which the piston moves, and they retain the water above them in such manner that it can not pass back to either chamber of the pump-barrel, thereby avoiding the necessity of a stuffing-box to keep the discharge-tube full, so that there is no loss while the pump is standing still.

Figure 1:
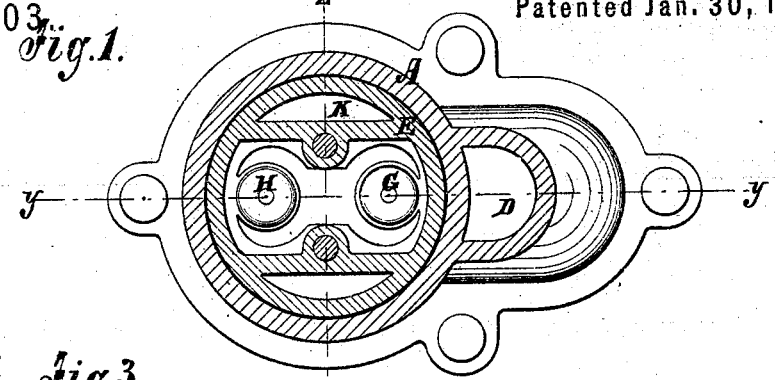
Figure 3:
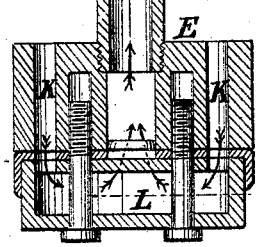
Figure 4:
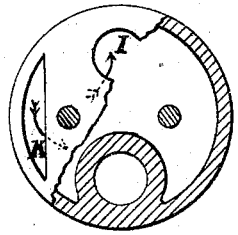
Figure 2:
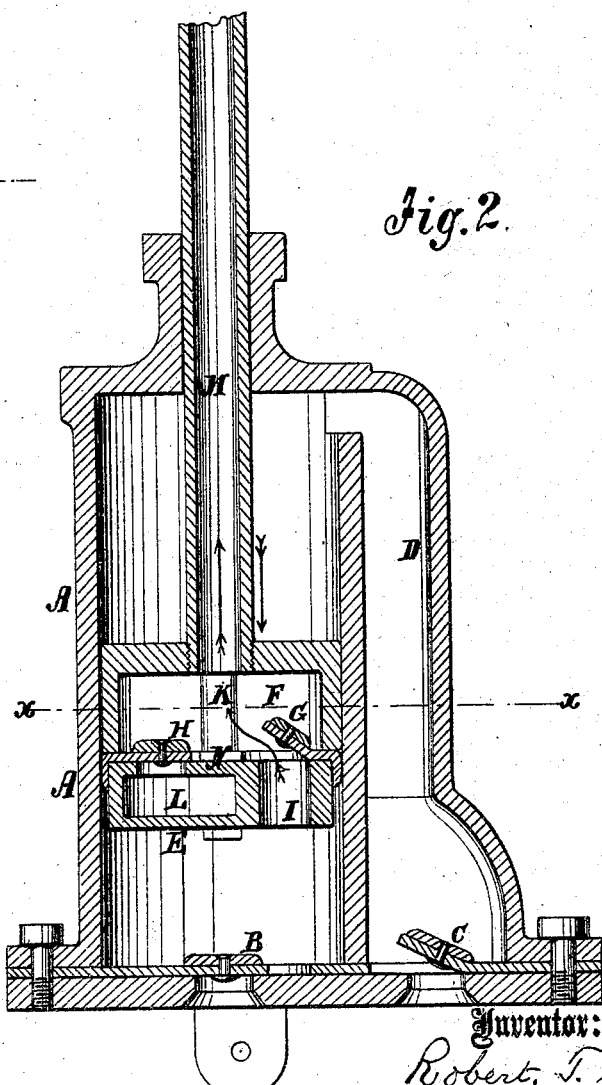

Figure 1 is a transverse section of our improved pump taken on the line $x\,x$ of Fig. 2. Fig. 2 is a sectional elevation on the line $y\,y$ of Fig. 1. Fig. 3 is a sectional elevation of the piston taken on the line $z\,z$ of Fig. 1; and Fig. 4 is partly a bottom view and partly a horizontal section of the piston.

Similar letters of reference indicate corresponding parts.

A is the pump-barrel; B, a valve in the bottom for the admission of water when the piston rises. C is another valve, and D a passage in connection therewith for admitting water to the top of the piston when it goes down. E is the hollow piston, having an upper chamber, F, into which the water flows through valve G when the piston goes down and through valve H when it goes up. When the piston goes down the water flows directly up from the lower part of the barrel through passage I to valve G; but when it goes up it flows to valve H from the upper chamber of the pump-barrel through the passages K and chamber L. M is the hollow piston-rod, through which the water is forced upward from chamber F in a continuous stream. It will be seen that, both of the valves being on top of plate N, which forms the bottom of the valve-chamber F, they close downward alike by gravity, and both will close whenever the piston stops working and retain the water in the tube, so that no time is lost in the beginning after the pump has been standing, as occurs in those cases where the water above the valves has access to the pump-barrel. I thereby dispense with a check-valve in the tube, which would otherwise be necessary to retain the water, which would leak out through the hole for the piston-rod unless a stuffing-box was used.

In case the pump is to be used horizontally, the relation of plate N and the chamber and passages with the horizontal piston will be so changed that said plate will still be horizontal to hold the valves so as to close by gravity.

Having thus described our invention, we claim as new and desire to secure by Letters Patent—

The hollow piston, having chambers F and L, passages I K, and the alternately-acting valves G H, said valves being both arranged on a plate, N, to close by gravity, and the said valve-chamber F being so inclosed in the piston that the water above the valves is entirely shut off from the pump-barrel, substantially as specified.

ROBT. T. SMART.
ROBT. T. SMART, JR.

Witnesses:
 D. W. FORD,
 W. H. OULUP.